(12) United States Patent
Radhakrishnan et al.

(10) Patent No.: US 9,861,226 B2
(45) Date of Patent: Jan. 9, 2018

(54) BREWER

(75) Inventors: Suresh Radhakrishnan, Chatham, IL (US); Charles H. Clark, Chatham, IL (US); Kent Morman, Edinburg, IL (US); John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 182 days.

(21) Appl. No.: 13/147,958

(22) PCT Filed: Feb. 4, 2010

(86) PCT No.: PCT/US2010/023238
§ 371 (c)(1),
(2), (4) Date: Aug. 4, 2011

(87) PCT Pub. No.: WO2010/091207
PCT Pub. Date: Aug. 12, 2010

(65) Prior Publication Data
US 2011/0293798 A1    Dec. 1, 2011

Related U.S. Application Data

(60) Provisional application No. 61/149,955, filed on Feb. 4, 2009.

(51) Int. Cl.
*A47J 31/44* (2006.01)
*A47J 31/10* (2006.01)

(52) U.S. Cl.
CPC .................................. *A47J 31/106* (2013.01)

(58) Field of Classification Search
USPC .......... 99/280, 307, 291, 279; 426/231, 521, 426/233
See application file for complete search history.

(56) References Cited

U.S. PATENT DOCUMENTS 2,601,579 A    6/1952    Wittmann
3,347,151 A    10/1967   Ronalds
(Continued)

OTHER PUBLICATIONS

Int'l Search Report and Written Opinion issued in app. No. PCT/US2010/023238 (dated 2010).

*Primary Examiner* — Michele L Jacobson
*Assistant Examiner* — Preston Smith
(74) *Attorney, Agent, or Firm* — Barnes & Thornburg LLP

(57) ABSTRACT

A brewer, system and method for heating water and dispensing heated water for producing a brewed beverage The brewer includes a water reservoir with a heating element associated with the reservoir for heating water retained in the reservoir A brewing substance holder is associated with the reservoir for receiving heated water from the reservoir A temperature sensitive control valve is provided in communication with the reservoir for controllably dispensing heated water from the reservoir to the brewing substance holder The temperature sensitive control valve may be in the form of a passive control valve which uses a bimetallic, magnetic or other material which is responsive to heat The water is placed in the reservoir and heated The elevated temperature of the water will result in operating the heat sensitive control valve to open the control valve and allow water to pass from the reservoir to the brewing substance holder.

12 Claims, 9 Drawing Sheets

(56) References Cited

U.S. PATENT DOCUMENTS

| | | | |
|---|---|---|---|
| 3,442,199 A | 5/1969 | McGrail | |
| 3,589,559 A * | 6/1971 | Colton et al. | 222/23 |
| 3,606,829 A | 9/1971 | Alwood | |
| 4,303,196 A * | 12/1981 | Raines et al. | 236/88 |
| 4,674,400 A * | 6/1987 | Rondel et al. | 99/279 |
| 4,917,005 A * | 4/1990 | Knepler | 99/280 |
| 5,183,998 A | 2/1993 | Hoffman et al. | |
| 5,307,733 A | 5/1994 | Enomoto | |
| 5,718,162 A | 2/1998 | Hoover | |
| 5,823,095 A | 10/1998 | Walker | |
| 5,964,141 A | 10/1999 | Andrew et al. | |
| 6,003,569 A | 12/1999 | Williams | |
| 6,050,175 A | 4/2000 | Mirand et al. | |
| 6,227,101 B1 | 5/2001 | Rabadi et al. | |
| 6,279,459 B1 | 8/2001 | Mork et al. | |
| 6,705,208 B2 | 3/2004 | Lassota | |
| 6,729,226 B2 * | 5/2004 | Mangiapane | 99/291 |
| 6,964,222 B1 | 11/2005 | Tucker | |
| 7,231,870 B2 | 1/2007 | Lowe et al. | |
| 2004/0118298 A1 | 6/2004 | Lee | |
| 2005/0247206 A1 | 11/2005 | Lyall et al. | |

\* cited by examiner

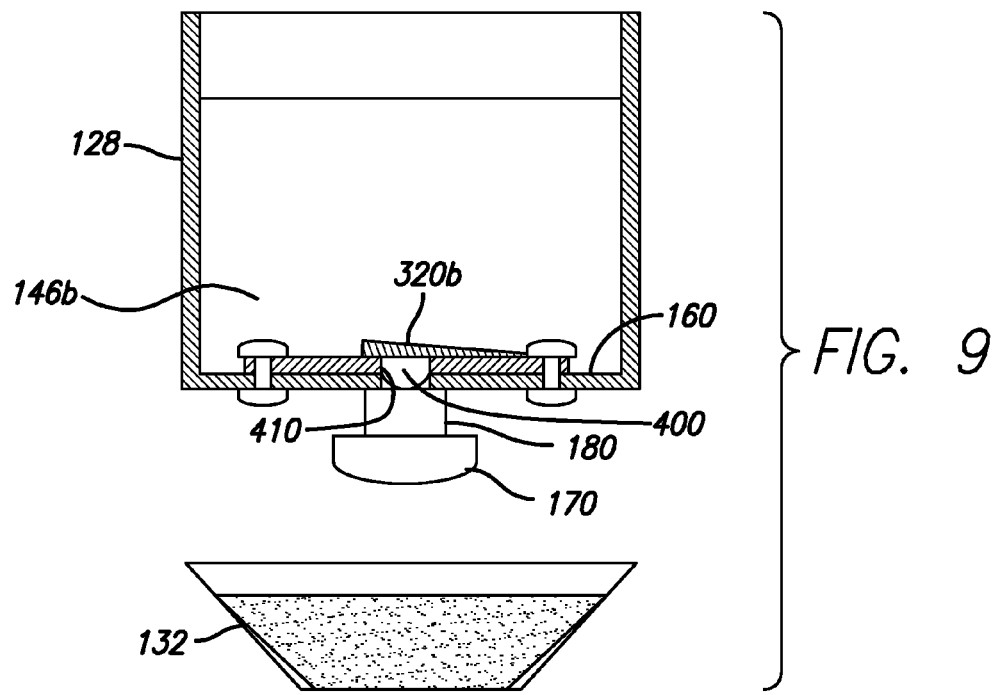
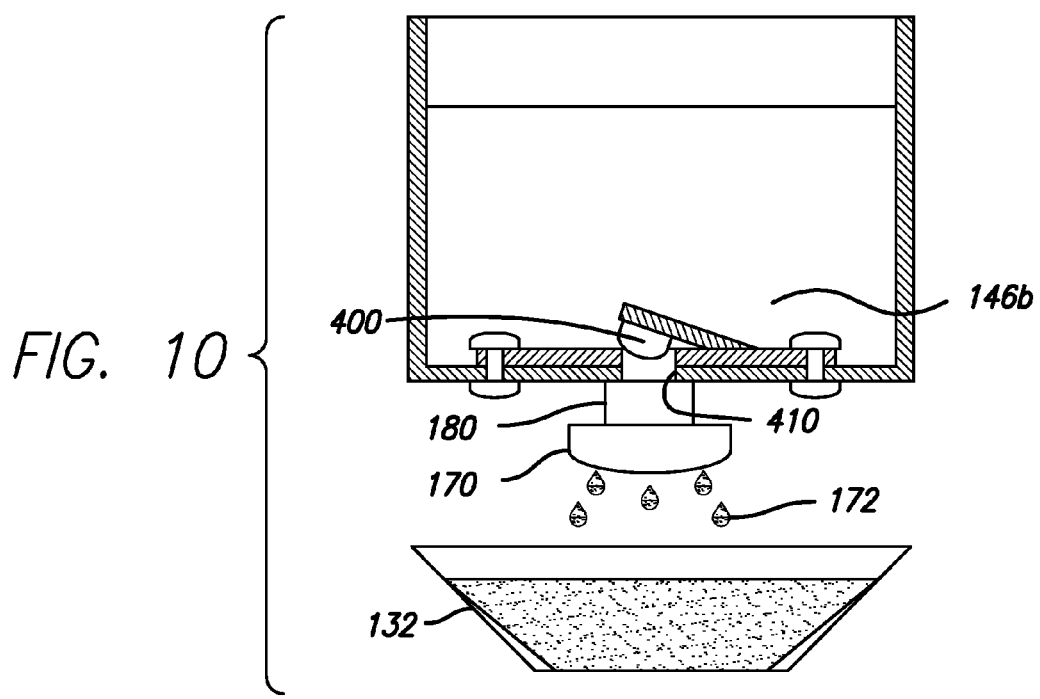

BREWER

CROSS-REFERENCE

This patent application is a U.S. nationalization under 35 U.S.C. §371 of International Application No. PCT/US2010/023238, filed Feb. 4, 2010, which claims priority to U.S. Provisional Patent Application No. 61/149,955, filed Feb. 4, 2009. The disclosures set forth in the referenced patent applications are incorporated herein by reference in their entireties, including all information as originally submitted to the United States Patent and Trademark Office.

BACKGROUND

The present disclosure relates to beverage preparation apparatus, namely, brewers for infusing a beverage making substance with a heated substance such as water to produce a beverage.

A variety of beverage brewers have been developed which can be divided into two general classes. The two classes of beverage making equipment generally include pour-over brewers and boil-over heat pump or "burp and boil" brewers. There are differences and benefits associated with the use of a pour-over brewer compared to a heat pump brewer. These differences generally relate to the speed with which a beverage can be produced as well as the quality of the beverage produced. The heat pump brewers tend to take a considerably longer amount of time to produce the same volume of beverage and tend to brew the beverage at a temperature which may not be controlled and may be too hot to obtain an optimum brewed beverage.

The pour-over brewing system generally includes a heated reservoir which retains a volume of heated water. A quantity of water is added to the reservoir to displace the heated water thereby displacing or driving heated water out of the reservoir and into a brew basket or funnel portion of the apparatus which retains a brewing substance for brewing with the heated water. Since the water is provided in a heated condition and merely displaced by water entering the heated reservoir, the pour-over brewer operates as an "on demand" brewer. Additionally, the water added to the heated reservoir can be heated during the brewing cycle to increase the through put of brewing cycles. Additionally, the temperature can be better controlled since the motive force to dispense the heated water is the displacement of the heated water from the reservoir.

In contrast, a burp and boil system generally provides longer brew times and less temperature control resulting in less controllable resultant brew characteristics. The burp and boil system operates by providing a reservoir for receiving water which feeds a heated water line. The heated water line is heated by a resistance heating configuration. The water line is connected to the reservoir thereby providing a source of water to fill the water line. As water enters the line while the line is heated, water rapidly is heated, boils and expands out of the line and into the brewing substance. A less desirable side effect of this process is that the water must be heated to boiling or near boiling to be moved through the brewing cycle. In other words, the motive force for moving water from the reservoir through the brewing apparatus is the boiling process.

It has been reasoned that it may be desirable to increase the efficiency of the energy used to brew a beverage. In both of the two general types of brewing apparatus a relatively considerable amount of energy can be expended to produce a brewed beverage. The pour-over system conserves energy by using a lower temperature than the burp and boil system. However, an incremental amount of energy must be used to maintain the water in the reservoir at a desired temperature. In the burp and boil system, energy might be conserved by not maintaining a reservoir of water at a desired temperature but a considerable amount of energy must be spent to rapidly raise the temperature of the water to produce the boiling motive effect.

BRIEF DESCRIPTION OF DRAWINGS

The present disclosure will be described hereafter with reference to the attached drawings which are given as a non-limiting example only, in which:

FIGS. 9 and 10 show a general diagrammatic illustration of a version of a bimetallic valve assembly in a closed position and an open position, respectively.

Figure 1:
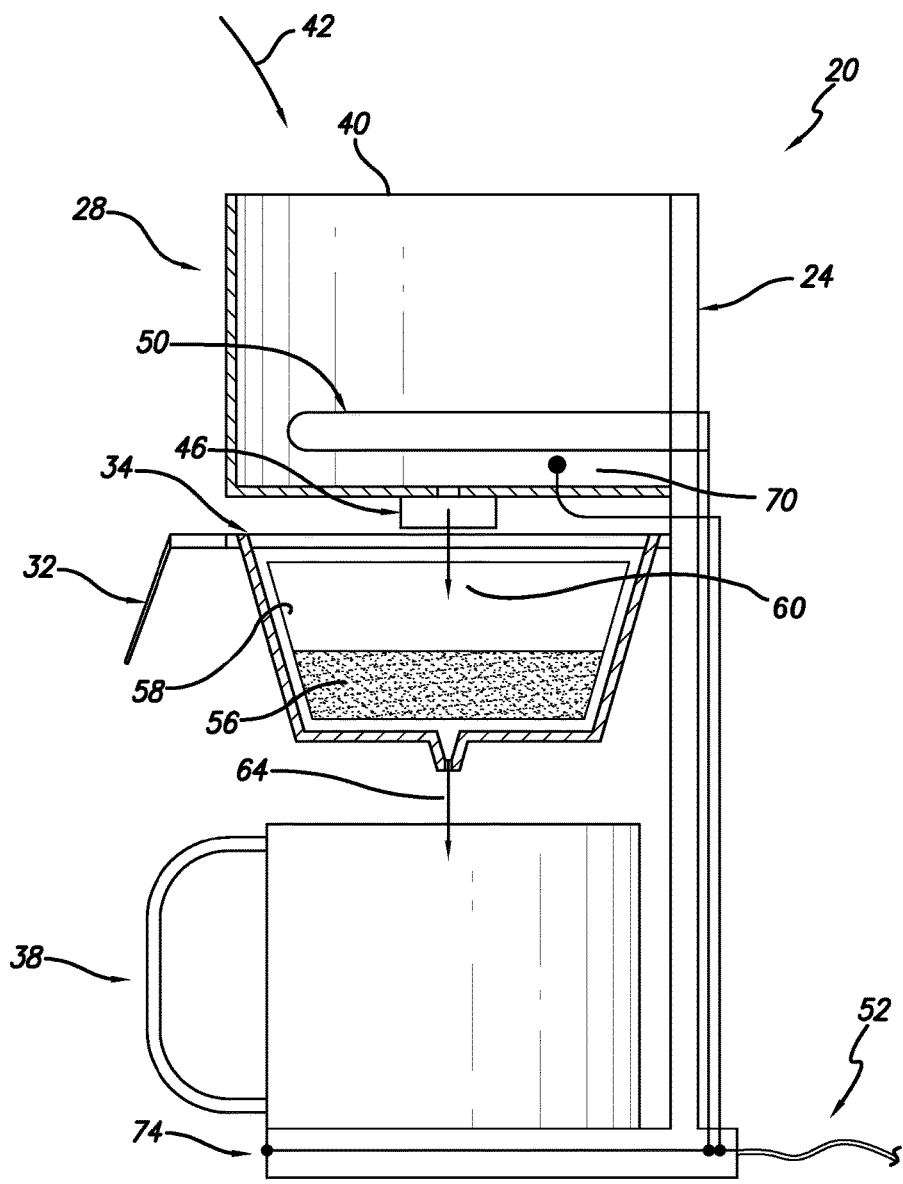
FIG. 1 is a general diagrammatic illustration of a brewer including a reservoir for receiving water for use in a brewing process, a brewing substance holder for retaining brewing substance during the brewing process and receiving water from the reservoir, and a container for receiving brewed beverage dispensed from the substance holder and further including a heating element, controllable valve, and support structure.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying modes of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

As shown in FIG. 1, a brewer 20 is shown. The brewer includes a support structure 24. The support structure 24 includes a reservoir 28 depending therefrom, a brewing substance holder 32 depending from a support member 34 and/or the reservoir, and a container 38 positioned proximate to the brewing substance holder 32 and reservoir 28. The illustration of FIG. 1 is shown in broad general diagrammatic illustration form to convey information relating to the general concepts of the brewer. A more specific embodiment follows and will be described with reference to FIG. 2.

Figure 2:
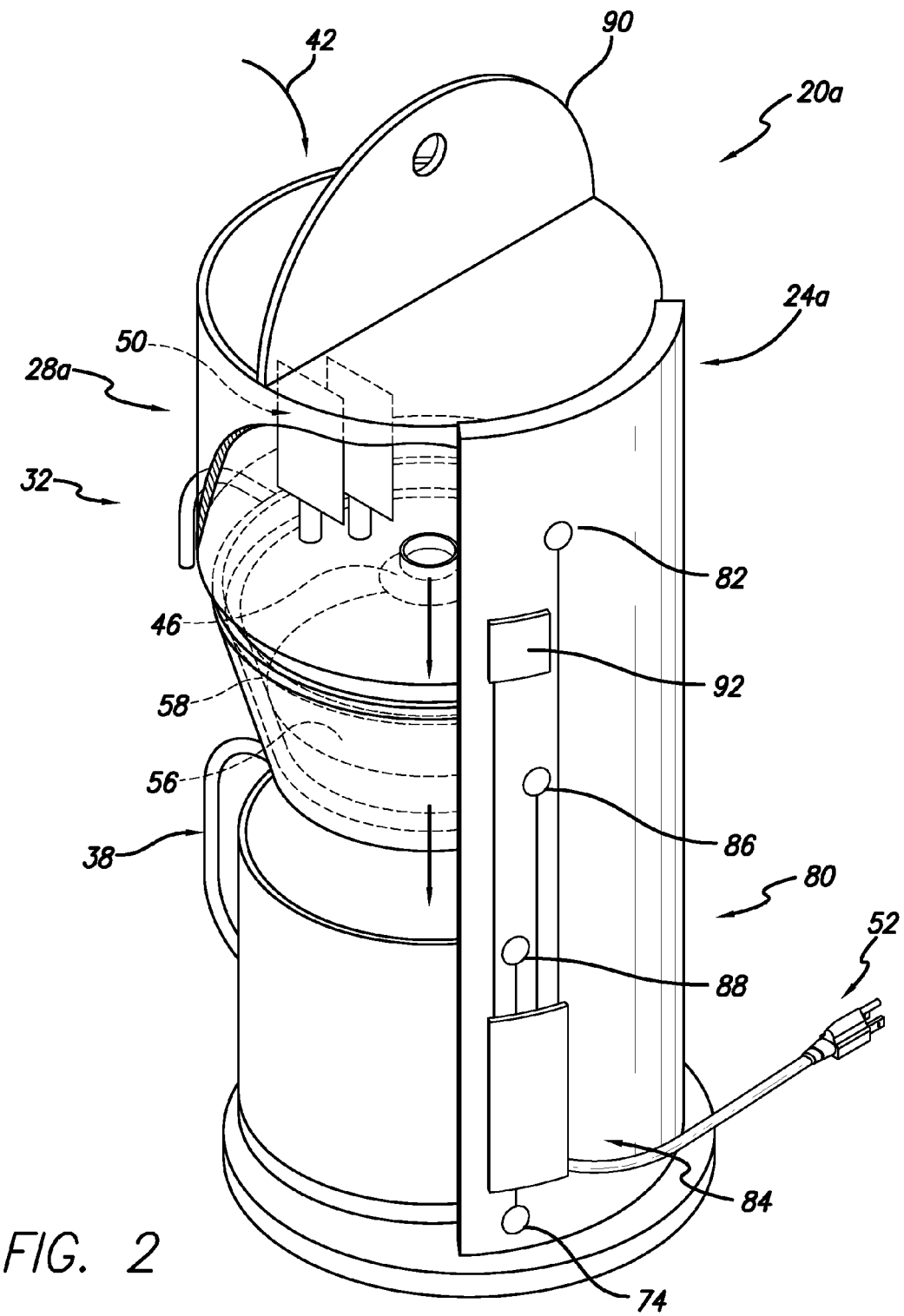
FIG. 2 is a general diagrammatic illustration of a brewer as disclosed in FIG. 1 further including a sensor for detecting the presence or absence of water in the reservoir, a sensor for detecting the presence or absence of the brewing substance holder, a detector for sensing the presence or absence of a container, a power supply for use in controlling the heating element, and a controller coupled to the sensors and power supply for controlling the operation of the energy conserving brewer.

With reference to FIG. 1, the cross sectional view reservoir 28 shows an open upper portion 40 for receiving water 42 therein. Once water is poured into the reservoir a control valve 46 positioned generally at a lower end of the reservoir 28 prevents water from draining from the reservoir 28 to the brewing substance holder 32. The control valve 46 will be described in greater detail below. A heating element 50 is provided generally in the reservoir or otherwise proximate to the reservoir for the transferring heat energy to water in the reservoir. As shown in FIG. 1 and FIG. 2, power is supplied through an electrical connection 52 to the heating element 50. The heating element 50 is provided by way of illustration and not limitation and it is envisioned that other forms of heating elements which might be used with such a system are included within the scope of this disclosure.

The brewing substance holder 32 provides a vessel for retaining a volume of brewing substance 56. As shown, the brewing substance 56 is in the form of ground coffee, tea or other brewing substance of a known type. This brewing material 56 is retained in a filter 58 retained within the holder 32. Water 60 is dispensed from the reservoir 28 through the control valve 46 and flows into the holder 32. The water 60 thereupon mixes with the brewing substance 56 which allows brewed beverage 64 to drain from the holder to the container 38. While a brewing substance holder for use with a brewing substance as generally known in the art is disclosed, it is envisioned that other brewing substances may be used in this embodiment. Additionally, other versions of the filter 58 such as a permanent filter or structures of the holder 32 which include other constructions are fully anticipated as being included within this disclosure. For example, coffee pouches, packets, pods or other self contained brewing substance and filter structures can be placed in the holder 32 for infusion by the water 60. Once infused, brewed beverage 64 flows into the container 38.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

While the embodiment as shown in FIG. 1 generally does not provide a significant amount of circuitry other than the heating element 50 and associated power source 52, a thermostat 70 can be incorporated in this embodiment to prevent overheating. The thermostat 70 is positioned in or proximate to the reservoir 28 and coupled to the power source 52. If an overheating condition is detected, the thermostat 70 can open the circuit associated with the power source 52 thereby curtailing the addition of energy to the reservoir 28. This provides an additional level of safety in the event that water drains from the reservoir and the heater 50 is allowed to continue to heat unchecked. Additionally, a control switch 74 can be provided on the support structure 24 and coupled to the power source 52. The control switch 74 can be in the form of a simple timer switch which remains closed for a predetermined period of time generally associated with the time required to heat a volume of water placed in the reservoir 28. This would allow a precalculation of heating time whereupon after the lapsing of this time power to the heating element 50 would be terminated.

While there are any number of controls which might be added, interconnected or otherwise used with this brewer 20 one of the heating controls is the controllable valve 46. The controllable valve 46 is envisioned as being a passive valve such that it does not require an electrical connection to operate the valve. An example of an active valve might be an electrically controlled solenoid valve. However, it is envisioned that the controllable valve 46 might be of a construction to use a control material such as a bimetallic material, shaped memory alloy material, or a thermally sensitive magnetic material having a predetermined Curie point. The use of a passive valve helps to improve the performance of this system and the efficiency of this system. The use of a passive valve will allow the system to be predesigned with a valve that opens at a desired brewing temperature. For example, if the valve opens when a relevant volume of water in contact with the valve reaches a predetermined temperature, for example 190° F., the valve will open and start dispensing water from the reservoir 28 to the end substance holder 32.

The valve 46 is in a normally closed state and will remain open after a desired temperature is achieved. Also, the valve 46 is designed and/or configured to remain open for a predetermined period of time after the draining of water from the reservoir 28. The timing is based on temperature change of the control material used in the valve. This prevents premature closing and thorough emptying of the reservoir 28. An additional benefit of remaining open for a predetermined period of time is to allow the removal, evaporation, or draining of water from the valve. This helps to prevent the accumulation of lime on the valve. Lime is further inhibited by the draining of the tank at the end of each cycle. If water does not remain in the reservoir very little dissolved minerals will be available to develop lime scale in the valve in the reservoir and the opening in the valve.

The control valve 46 can be a device that performs multiple functions. The valve can be configured to provide a slow control as well as to provide a pattern in the spray head to produce a desired water delivery or spray pattern. In this configuration, the surface of the valve 46 closest to the funnel 32 can be in the form of a spray head. Spray heads are generally known in the art. The spray head can be configured with any desirable surface characteristics such as a convex curve as well as any other characteristics such as slots, holes, mesh or other features. The goal of the spray head is to provide a distribution of water over the brewing substance 56 retained in the funnel 32 to produce a selected result.

Additionally, the control valve 46 can be permanently fastened to the reservoir 28 or may be designed to be removable. If the control valve 46 is permanently attached it can be molded into the reservoir 28 or can be fastened after formation of the reservoir. The valve 46 can be fastened permanently or removably to allow removal of the valve for cleaning or other purposes. Alternatively, if the control valve is removable, it can be removable to allow replacement of other similarly dimensioned control valves to provide different functions and/or characteristics. In this regard, a control valve might be provided with or without a spray head, to provide a predetermined flow rate or any other features. For example, one valve might be designed and configured for use in brewing coffee. Another valve might be designed and configured for use in brewing tea. The tea-brewing version of the valve might be designed so as to produce a slower flow rate to increase the steep time associated with the use of tea brewing substance. Similarly, the control valve used for brewing tea may be configured to open at a lower temperature such that, for example, 160° may be a more desirable temperature for brewing a particular type of tea rather than 195° F. which might be used for brewing coffee. As such, the use of different valves can provide different results and allow the user to modify the machine for specific uses.

As an additional matter, the body may be adjustable to allow the reservoir and funnel to be raised relative to the container 38 used with the brewer. In this embodiment, the body 24 is configured with an adjustable portion to allow the user to disengage a retaining mechanism, adjust the body to the desired dimension, and then retain the desired adjustment with the retaining device. This adjustability allows a container of different sizes to be used with the brewer 20.

Also, a secondary reservoir can be attached to the body 24 to provide a holding chamber for liquid beverage concentrate, milk, or other ingredients. In this regard, the secondary reservoir provides a dispense path which feeds into the funnel 32 or container 38 to accommodate the dispensing of other ingredients into the hot water.

The present disclosure allows for removal of the holder 32 from the brewer 20 at the end of a brewing cycle. Additionally, the container 38 can be removed for serving or, if it is a smaller volume for drinking.

With reference to FIG. 2, a brewer similar to that as shown in FIG. 1 is shown. Since the design of the two brewers is very similar the description of the components in FIG. 2 which are similar to or identical to that as shown in FIG. 1 will be described using the same reference numbers with the addition of an alphabetic suffix, for example, reservoir 28a.

As shown in FIG. 2, the reservoir 28a provides water to the substance holder 32 which drains into a container 38. Brewing substance 56 retained in the filter 58 is infused with water 42 heated by and dispensed from the reservoir 28a. The support structure 24a further includes support or housing for circuitry 80 as described in greater detail below. The support structure 24a and that as shown in FIG. 1 provides a convenient and efficient way to present or otherwise align and orient the substance holder 32 with the container 38. The circuitry 80 can include a sensor 82 for detecting a level of water in the reservoir. In other words, the sensor will detect a level of water in the reservoir and provide a signal to a controller 84 associated with the support. As such, the control 84 can be configured to control the operation of the heating element 50 in response to the presence or absence of water as detected by the sensor 82. Similarly, a sensor 86 is provided to detect the presence or absence of the holder 32. This sensor 86 is also connected to the controller 84. Finally a sensor 88 may be provided to detect the presence or absence of the container 38. Likewise, the sensor 88 is coupled to the controller 84 for providing information for use and controlling the brewer 20a. The controller is coupled to the power source 52 and a control switch 74.

In use, a lid 90 may be displaced to allow water 42 to be placed in the reservoir 28a. Once the controller 84 detects the presence of water 82 and detects the presence of a holder 32 and a container 38 the brewing cycle can be initiated. If one of the three signals cannot be detected then the brewing cycle is not initiated. In other words, if water 42 is detected in the reservoir 28a and the container 38 are detected but a holder 32 is not detected the controller 84 can inhibit the start of the brewing process. This eliminates just creating heated water. Similarly, if the start switch 74 is activated but no water is detected the controller 84 can inhibit the brewing process. Otherwise heat would be provided to the heating element 50 in the absence of water and could damage the heating element or the brewer. Finally, the brewing process will also be inhibited if a container 38 is not present. This helps to prevent a mess which might otherwise occur if the brewing process was allowed to proceed in the absence of a container. The controller 84 is coupled to a power supply or control 92, if necessary, coupled to the heating element 50. By relying upon a passive control valve 46 the valve will not open unless the water is heated. If the controller primarily controls the heating of the water the system will remain at steady state unless power is provided to the heating element 50. In other words, if a fault signal associated with a missing component such as water 42, holder 32, or container 38 is detected the brewing process is halted. However, once all the essential components are in place the brewing process will continue upon activating the start switch 74. Once a desired brewing temperature is achieved the valve 46 will open to allow drainage of the water there through. The valve as shown in FIG. 2 can be configured in the form of a spray head to distribute water over the brewing substance 56 in a desired pattern.

An additional degree of control can be provided in association with the brewer 20a by using the heating element 50 to impact the flow of water from the reservoir 28a. In this regard, energy can be provided to the heating elements whereupon the elements heat up, transfer the heat to the water and the reservoir and then cause the valve to open. By terminating power to the heating elements a degree of control can be achieved which allows the valve to close if sufficient cooling occurs. The valve can be opened again to increase the flow after a steep time or otherwise halting the water flow by reenergizing the heating elements. Once energized the heating elements provide heat to the water, heating the water and opening the valve 46.

Once again at the end of the brewing process once the water has drained from the reservoir and after a predetermined period of time in response to the cooling or other state transition of the valve 46, the valve will close. The normally closed valve 46 allows the brewer to be reset for the next brew cycle at the conclusion of each brew cycle.

The present configuration also allows the container 38 to be used as the supply source for water 42 to the reservoir 28a. In this regard, a desired quantity of water can be placed in the container 38 and used to transfer the water to the reservoir. The use of the sensor 88 allows the user to pour water into the reservoir yet not allow the brewing cycle to start. The brewing cycle will not start due to the absence of the container 38 thereby preventing the sensor 88 from detecting the container. Once the water is dispensed from the container to the reservoir the container can be placed on the support structure 24a whereupon the sensor 88 detects the presence of the container and provides a signal to the controller 84 to permit the initiation of the brewing cycle. The wattage associated with the heaters 50 can be selected to provide the optimum heating condition in combination with the passive control valve 46. This will permit a sufficient amount of energy to be transferred to the water in the reservoir while not wasting a significant amount of heat which might otherwise radiate to the surrounding environment. This helps to further conserve energy.

Also, any number of materials associated with the present disclosure can be provided from recycled sources. For example the support structure 24 can be provided of a recycled material as well as the reservoir, holder 32, and container 38. The incorporation and use of these materials help enhance the favorable characteristics this brewer. Additionally, by minimizing the components used in this brewer and in particular providing a brewer which has few if any circuit components, the recycleability of the brewer can be enhanced. This will help further provide incentive to a manufacturer to produce a brewer which can be returned to the manufacturer for disassembly and future recycling. Additionally, if the brewer can be produced at a low enough price point the brewer can be returned to the manufacturer for material recovery. This also permits the return and recovery of materials in the event of damage to the machine or failure of any components.

Figure 3:
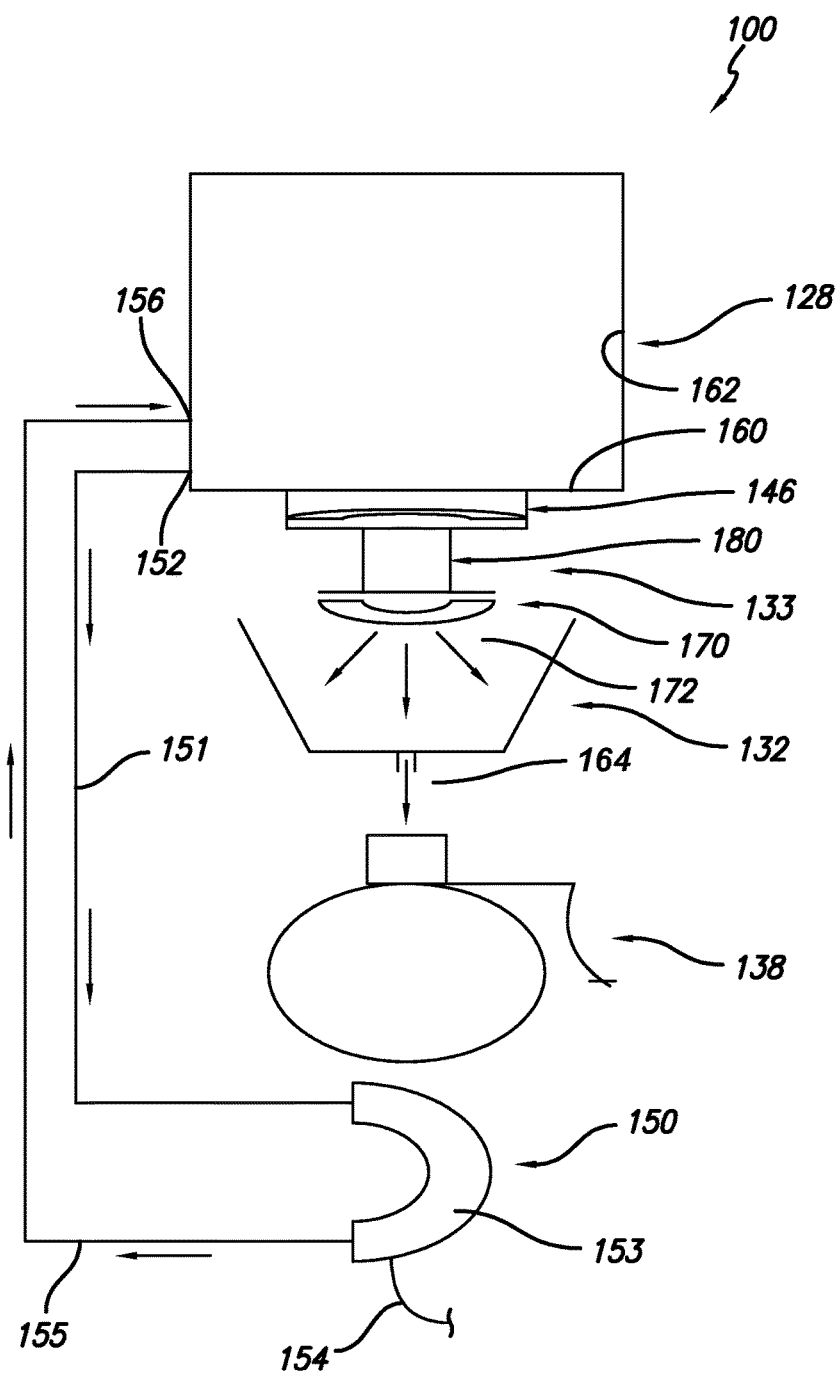
FIG. 3 is a general diagrammatic illustration of a brewer including a reservoir positioned above a brewing substance holder, a container position there below, and a heating element assembly including paths to and from the reservoir for heating water in the reservoir through a circuitous route from the reservoir through the heater and back to the reservoir, and a bimetallic valve structure for controllably releasing heated water from the reservoir to the brewing substance holder.

With reference to FIG. 3, a brewer 100 is shown which includes a reservoir 128, a brewing substance holder 132 which is positioned approximate to an outlet 133 of the reservoir 128. During a brewing cycle, which will be explained in greater detail below, heated water is accumulated in the reservoir and dispensed through the outlet assembly reservoir 128 and dispensed through the outlet assembly 133. Water flowing through the outlet assembly 133 flows into the beverage substance holder 132 for mixing with a brewing substance (not shown) retained in the substance holder 132. A brewed beverage 164 drains from the holder 132 into a corresponding container 138 there below.

The outlet assembly 133 includes a control valve 146. Various embodiments of the control valve 146 will be described in further detail below with reference to FIGS. 5-12. Water is dispensed into the reservoir 128 and prevented from flowing out through the outlet assembly 133 by the control valve 146 which is in a normally closed position. During a heating process water retained in the reservoir 128 will be heated to a selected or generally predetermined temperature by the heating element and during which the temperature corresponds to a control temperature of the control valve. Once the selected control temperature is reached the control valve then opens and allows water to flow through the outlet assembly 133.

While the overall operation of the embodiment is shown in FIG. 3, is similar to that as shown in FIGS. 1 and 2, the method of heating is different between the two embodiments. While a heating element 50 is shown positioned generally in or proximate to the reservoir 128 in FIG. 1, a heating system 150 is used on the embodiment of FIG. 3. As shown in FIG. 3, the heating system 150 includes an outlet passage 151 coupled to and connecting with the reservoir at port 52 providing a passage for water to flow from the reservoir 128 to a heating element 153. Water flowing through the passage 151 flows into the heating element 153. The heating element is controllably heated via power line 154. As the water is heated in the heating element 153 it is passed to the outlet line 155 to flow back to the reservoir through a port 156 communicating with the reservoir 128.

This heating system provides a circuitous heating path by which water in the reservoir 128 is heated. The heating path provides an efficient way to transfer energy from the heating element 153 to the water thereby raising the temperature of the water. When the water in the reservoir 128 is heated to a target temperature, or general range of temperatures in a target range, the control valve 146 opens in response to achieving the target temperature and allows water to flow from the reservoir 128.

The disclosed embodiment provides for an efficient transfer of heat from the heating element 153 to the water and helps reduce cost of the overall brewing system. The type of heating element 153 can be obtained at relatively low cost. This helps eliminates more costly heating elements which might be retained within the reservoir. In addition, the materials used to fabricate the reservoir can be lower cost. The lower cost associated with merely holding heated water and not holding a heating element. The heating element could require more costly materials associated with an electrically energized heating element in the tank. The absence of placing the heating element in the reservoir helps reduce the cost of the reservoir. In other words, a plastic or nonmetallic reservoir 128 can be used in combination with a low cost energy efficient heating element 153. By placing the control valve 146 in a floor 160 portion of the reservoir 128 all of the water retained in the reservoir can drain off of corresponding walls 162, along the floor 160 and into the control valve 146.

A spray head 170 can be included in the outlet assembly 133. The spray head 130 can be used to direct the flow of water 172 to different areas of the brewing substance holder 132. A connecting port 180 communicating with both of the control valve 146 and the spray head 170 can be used to control the flow rate. The port 180 can be incorporated in the spray head 170 or maybe a separate component.

In use, a user places water into the reservoir 128 of FIG. 3. Water is retained therein until a brewing cycle is initiated.

A brewing cycle is initiated when the user controls the brewer by pressing a button or some other controlled device to provide energy to the heating element 153. As the heating element 153 heats up water flows through the outlet passage 151 towards the heating element. As the water is heated in the heating element it returns to the reservoir 128 through outlet passage 155. When the water has achieved its desired temperature, the control valve 146 is operated in response to the target temperature and allows water to flow from the reservoir 128 to the spray head 170. The water may range in temperature depending on the brewing substance being used in the substance holder 132. The corresponding elements of the control valve 146 can be selected so as to provide a desired target temperature or range of temperatures.

With reference to FIGS. 5-8, the control valve assembly 146 is shown. While one version of the control valve assembly 146 is shown other embodiments may be produced as well. Generally, the control valve assembly includes a housing 300 which includes a cover 310 and a base 312. A floor 314 of the base 312 includes an offset outlet 180 communicating with an internal surface of the base 312. A bimetallic element 320 is positioned in the base in a normally closed configuration. A seal 322 is positioned between the floor 314 of the base and the rim of the bimetallic element 320. The cover is attached to the base using retaining structure 330 and 332. Downwardly extending wall portions 340 capture the gasket 320 against the floor 314. A fastener 342 extends through a series of corresponding holes and engages a boss 344 in the lower 314 of the base 312. A cover includes opening 346 through which water flows into the valve assembly 146. An o-ring is provided on an outside portion of the base 312 to provide a seal between the base and a corresponding portion of the reservoir. It should be noted that the control valve 146 is described herein with regard to FIGS. 5-8 can be employed in any of the embodiments disclosed.

The bimetallic element 320 is chosen for its responsive properties in the presence of heated water. In an unheated condition the bimetallic element 320 is generally flexed or downwardly oriented to seal against the seal 322 in the base 312. When the target temperature is achieved (as described above) the element 320 tends to flex upwardly thereby creating a gap between the element and the seal 322. The gap allows water to flow from the chamber designed between the cover 310 and the base 312 to the outlet 180. The bimetallic portion is generally retained by the fastener 342 against displacement within the chamber.

Figure 4:
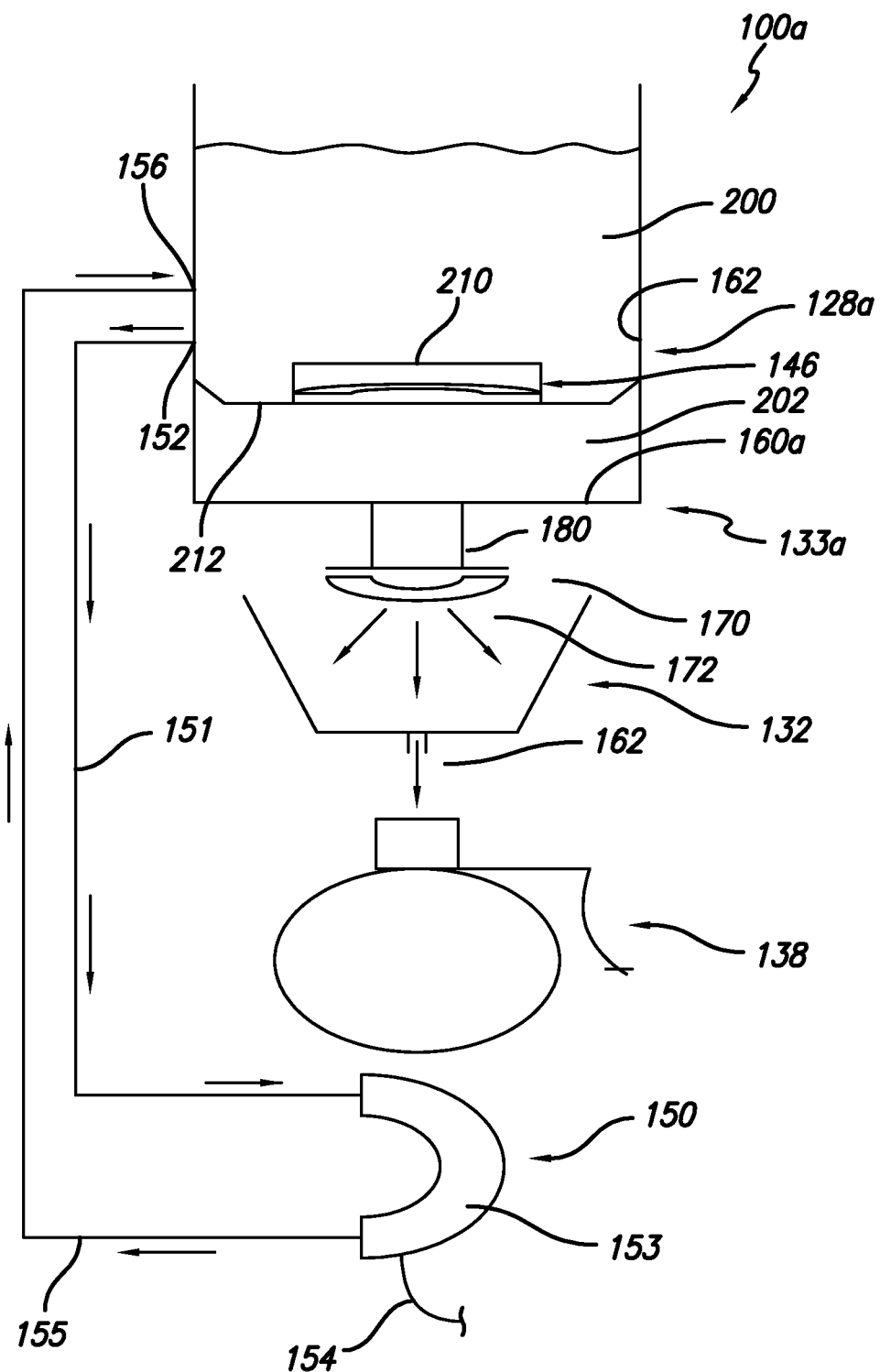
FIG. 4 is a general diagrammatic embodiment of a brewer similar to that as in FIG. 3 further including a first reservoir or chamber and second reservoir or chamber positioned below the first reservoir with water being heated by the circuitous heating method as shown in FIG. 3 resulting in activation of a bimetallic valve in the first chamber and draining of heated water from the first chamber to the second chamber there below to prevent over heating of water in the first chamber.
Figure 5:
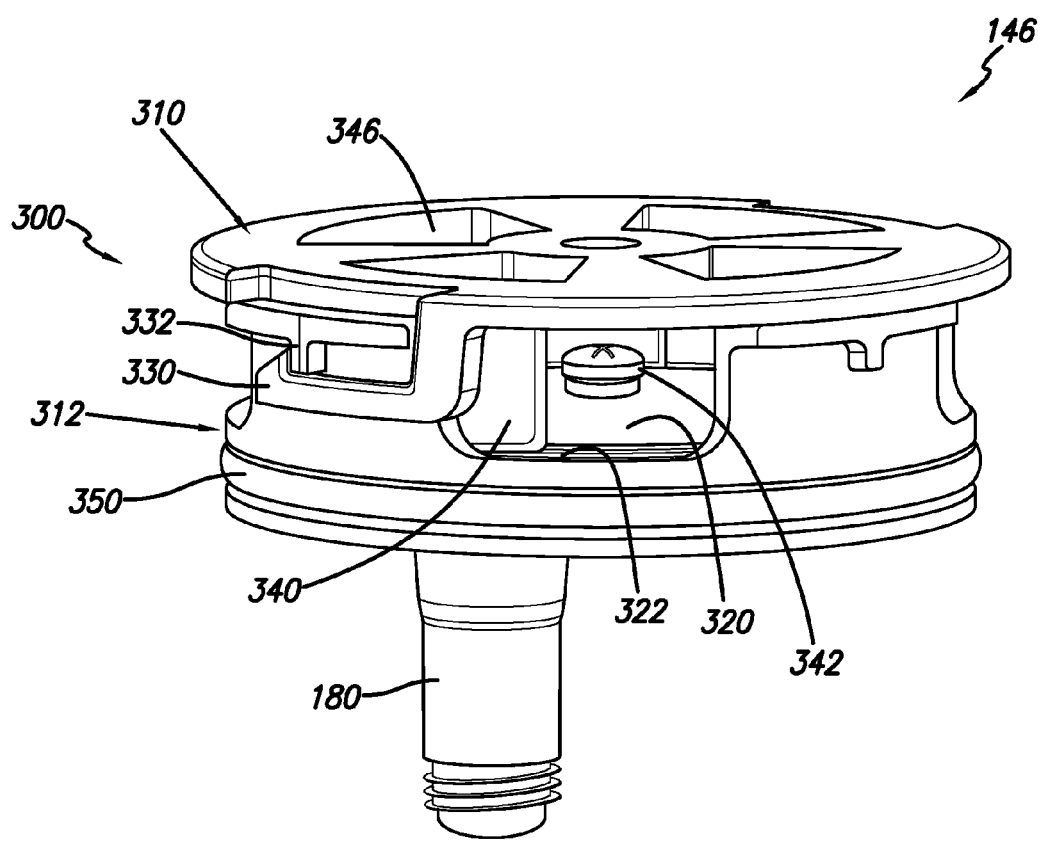
FIG. 5 is a more detailed illustration of one form of a bimetallic valve for use in the brewer as disclosed, the bimetallic valve assembly being shown in a perspective view.
Figure 6:
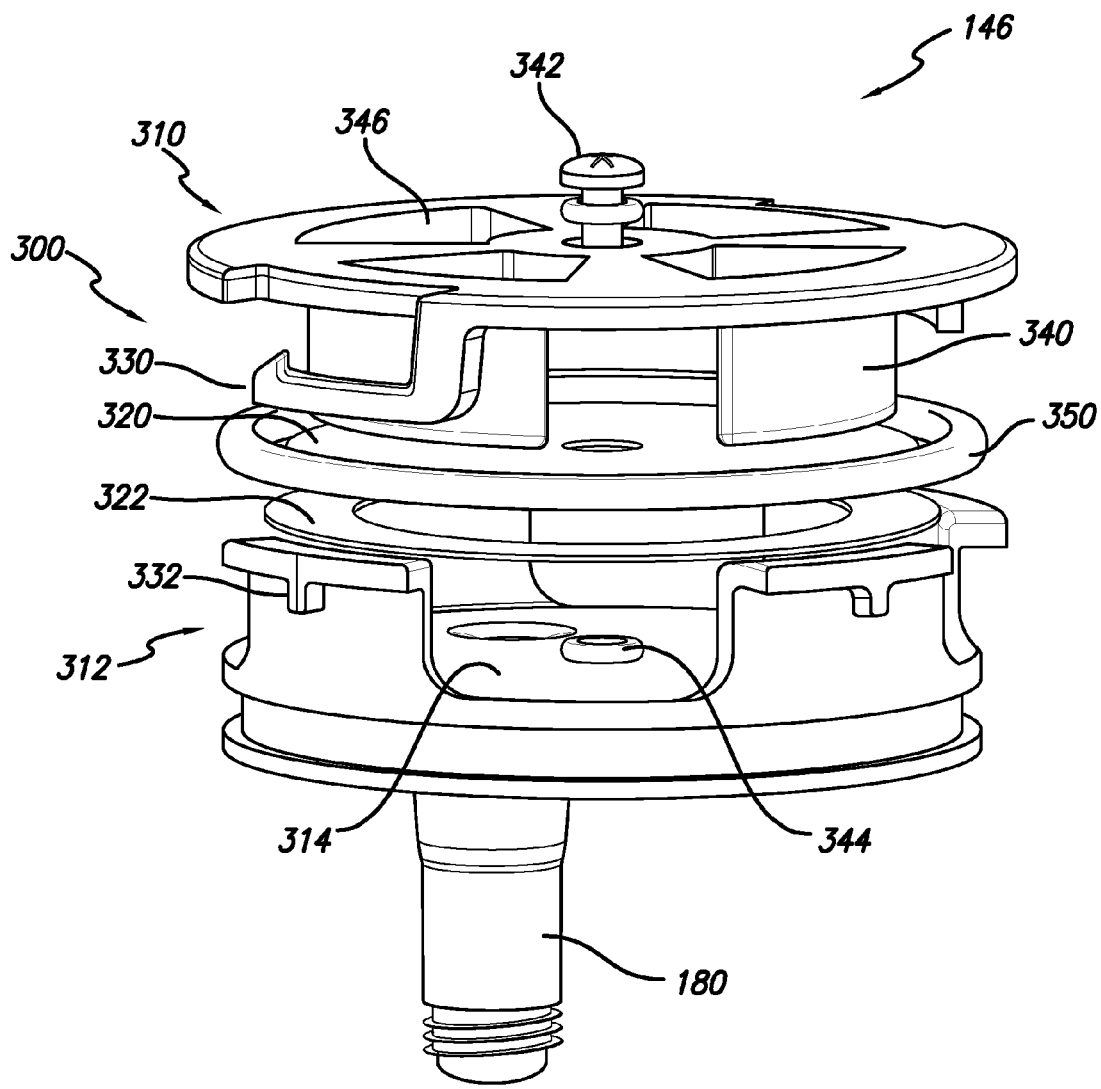
FIG. 6 is an exploded perspective view of the bimetallic valve assembly as shown in FIG. 5 including a cover portion, a base portion, a bimetallic disk, a corresponding seal positioned between the bimetallic disk and the base portion, and an o-ring for use on the outside of the base portion, a drain tube extending from an offset position in the base portion extending downwardly and attachable to a spray head at the distal end thereof.
Figure 7:
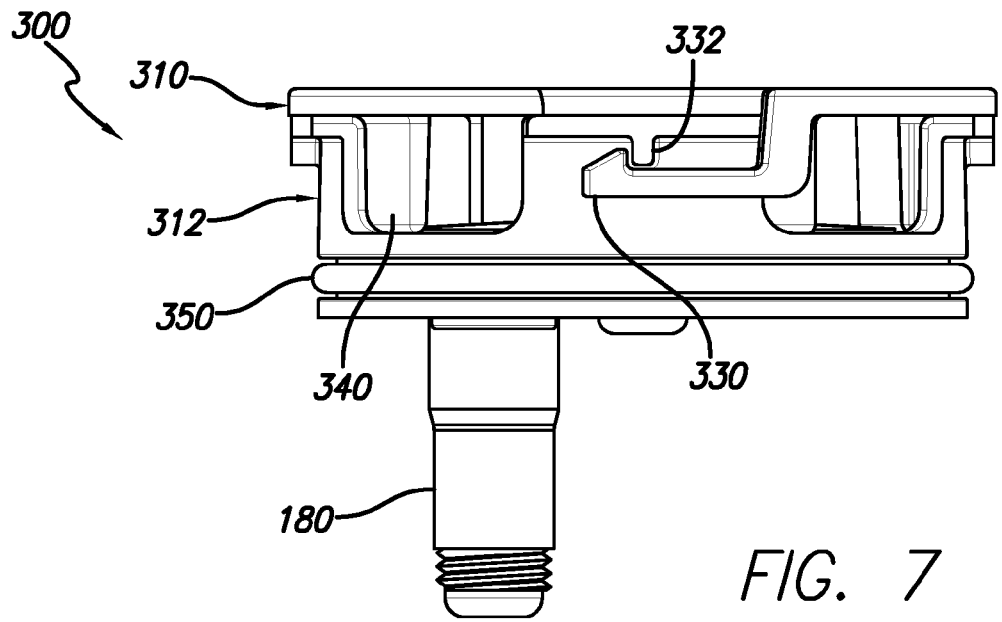
FIG. 7 is an elevational view of the bimetallic valve assembly as shown in FIGS. 5 and 6.
Figure 8:
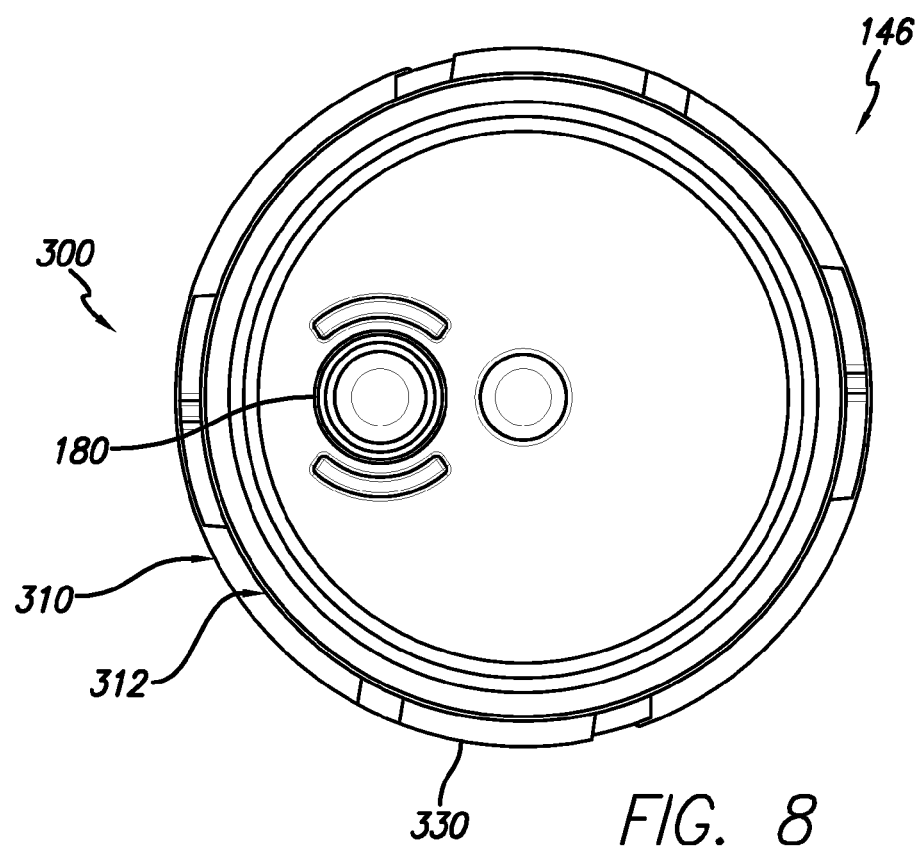
FIG. 8 is a bottom plan view of the bimetallic valve assembly.

Before turning to FIG. 4, we note that all of the descriptions provided herein are considered to be incorporated in all the various embodiments. It is believed that someone provided with the present disclosure herein would be able to combine these various embodiments to achieve additional alternate embodiments. While various embodiments are shown and described, applicant intends for these embodiments to be broadly interpreted and the embodiments are provided by way of illustration and not limitation.

With reference to FIG. 4, the overall structure of the brewer 100*a* is similar to that shown in FIG. 3. The primary distinction between these two embodiments resides in the reservoir 128*a* and the outlet assembly 133*a*. The reservoir includes a first chamber 200 and a second chamber 202 positioned below the first chamber. The ports 156 and 152 described with regard to FIG. 3 are still provided. However these ports 156, 152 communicate with the first chamber. As such, in use, a user dispenses water into the first chamber 200 of the reservoir 128*a*.

The second chamber 202 is positioned below the first chamber 200. The second chamber 202 is generally empty when water is placed into the first chamber 200. The second chamber 202 remains empty as a result of the control valve or bimetallic portion 210 being retained on a dividing wall 212. The dividing wall separates the first chamber 200 from the second chamber 202. The control valve 146 includes the bimetallic element 210. The remainder of the outlet assembly including the spray head 170 and the passage 180 are provided in a floor 160*a* of the second chamber 202.

The second chamber is used to reduce or eliminate excessive heating of the water through the heating element 153. The configuration shown in FIG. 4 might be used with a higher wattage heating element 153. As a result more energy can be transferred from the heating element 153 to the water in the first chamber of the reservoir 200. As the water rapidly heats, the control valve 146 opens releasing water from the first chamber 200 to flow into the second chamber 202. In the embodiment shown, there is no further restriction in the outlet bore 180 and spray head 170 and as a result water 172 flows into the brewing substance holder 132. The timing to stop circulatory heating and target temperature overshoot can further be enhanced by controlling the height of the inlet 152. As water flows from 200 to 202 heating will stop when inlet 152 is uncovered. The volume of chamber 202 may be substantially smaller than 200.

By providing the second chamber 202 water which has reached a selected target temperature can flow from the first chamber 200 to the second chamber 202 preventing further heating of the water. The volume of the first chamber and second chamber are sized and dimensioned so as to cooperate with the overall configuration of this assembly. In this regard it may be desirable to keep the vertical dimension of the chamber 202 generally to a minimum so as to avoid significant vertical dimension in the overall system. Additionally, the volume of the first chamber 200 must be at least sufficient to hold a desired quantity of water for use in the brewing process.

The combination of the first chamber 200, second chamber 202, control valve 146 retained between the two chambers 200, 202 and use of a higher wattage heating element 153 helps reduce the overall brew time. The user pours water into the first chamber 200 and activates a power switch to turn on the brewer. Once the heating element 153 is energized, water flows through the heating system 150 as described above with regard to FIG. 3. When the desired water temperature or target temperature is achieved, the control valve 146 opens to allow water to flow into the second chamber 202. Water is then dispensed to the brewing substance holder 132. Another possible consideration in the volume of the chamber 202 is the relationship between the flow rate through the control valve 146 from the first chamber 200 to the second chamber 202 and the outlet flow through the components 180, 172 of the outlet assembly 133*a*. Once again, the conclusion of the heating cycle, water drains from the reservoir 128*a* through the outlet assembly 133*a* to effectively drain the reservoir 128*a*. Similar to the embodiment as described in FIG. 3, various components can be designed, engineered and produced to help reduce costs yet provide safe and sanitary operation of the system.

FIGS. 9 and 10 and FIGS. 11 and 12 show reactive illustrations of two different embodiments of control valve. The control valve shown in FIG. 9 and the control valve 146*b* shown in FIGS. 9 and 10 relies on a bimetallic element 320*b* is cantilevered or extending from a single point. This is a variation on the element 320 as shown in FIGS. 5-8.

These additional embodiments are shown to provide further illustrations in the interest of further broadening the scope of this disclosure. As such these additional illustrations are provided by way of enhancing the disclosure and not to limit the disclosure.

With reference to FIGS. 9 and 10, the reservoir 128 retains water for use in a brewing cycle. While a specific form of heating the water is not shown in FIGS. 9 and 10, nor FIGS. 11 and 12, any form of heating which has been described in the present disclosure as well as any other form of heater which will cooperate with the present disclosure may be used. In other words, the heating strategy employed in FIGS. 1 and 2, FIG. 3, or FIG. 4 may be used in combination with these additional control valve embodiments. As shown in FIG. 9, the control valve 146b uses a bimetallic element 320b which is normally closed. In this regard, a seal portion 400 is shown carried on the bimetallic element 320b. The seal element engages a corresponding aperture 410 in the floor 160 on the reservoir 128. The bore 410 communicates with the passage 180 and the spray head 170.

When the water is heated to the target temperature, the bimetallic element flexes in response to the elevated temperature and disengages the seal portion 400 from the bore 410. As a result, water can pass from the reservoir to the spray head 170 and to the brewing substance holder 132.

Figure 11:
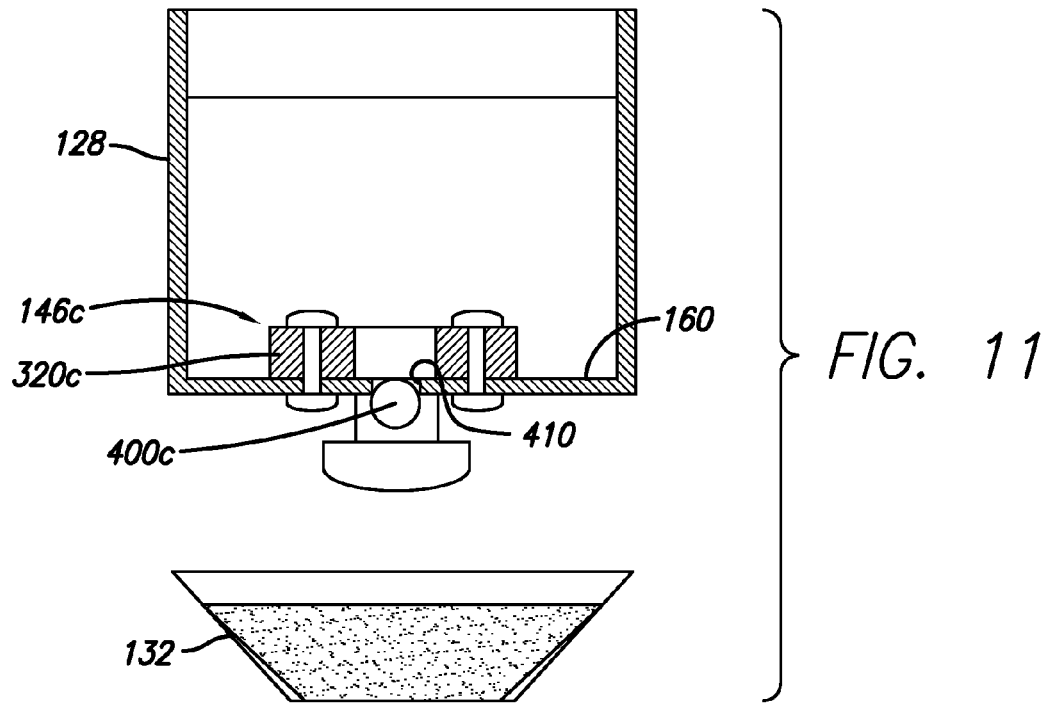
FIGS. 11 and 12 show a general diagrammatic illustration of an alternate embodiment of a valve assembly employing a temperature sensitive magnetic material which retains magnetic properties at a lower temperature and has reduced or eliminated magnetic properties at an elevated temperature resulting in the ability to attract or release a corresponding ball or other component for sealing an outlet opening.
Figure 12:
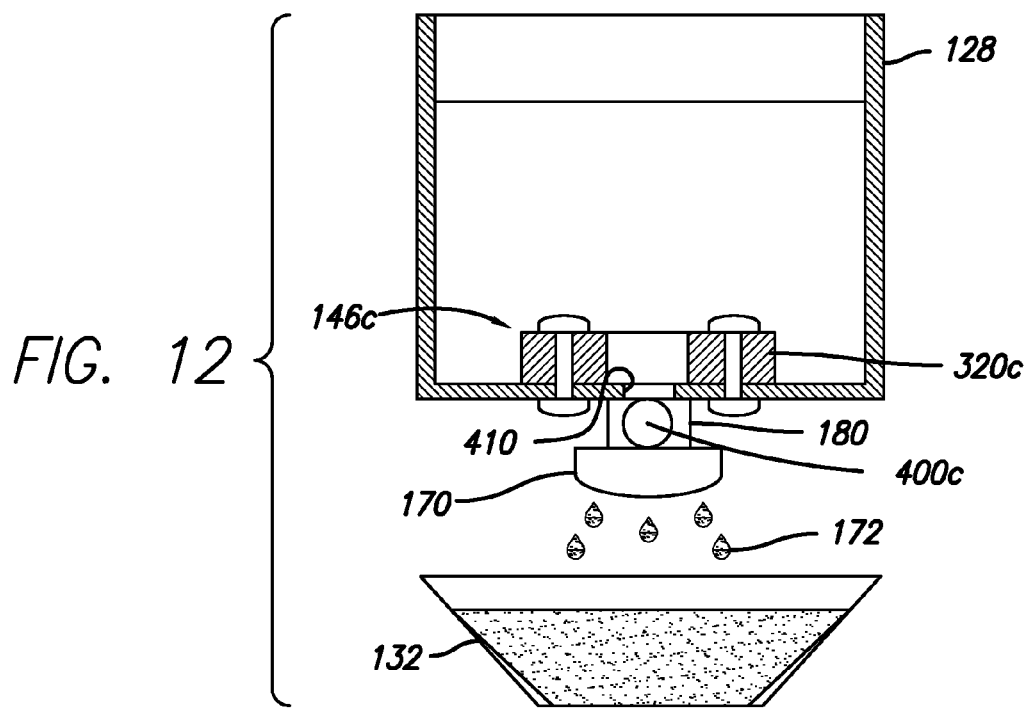

A variation on the control valve 146c is shown in FIGS. 11 and 12. Instead of employing a bimetallic element which changes dimensionally in response to elevated temperature, a temperature sensitive magnetic material is employed. In this regard, the temperature sensitive magnetic material acts to provide a magnetic force to retain a corresponding stopper 400c in a corresponding bore 410 in the floor 160 of the reservoir 128. When the magnetic material is heated as a result of the water in the reservoir being heated it tends to lose some portion of its magnetic properties. As magnetic properties are reduced the valve 146c will reach a point where the magnetic field can no longer suspend the stopper 400c. As a result, the stopper drops, within a retaining structure, and allows water to flow through the bore 410.

It should be understood that the additional embodiments of control valve 146b, 146c as disclosed in FIGS. 9-12 may be employed with any of the reservoir designs as shown herein. In this regard, these embodiments can be substituted for the control valve 146 in FIG. 3 as well as the control valve 146 in FIG. 4.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A brewer for heating water and combining the heated water with beverage making substance to produce a beverage, the brewer comprising:
   at least one reservoir for receiving water;
   a brewing substance holder positioned relative to the reservoir for receiving water therefrom for combining, in the holder, substance in the holder with water dispensed from the reservoir;
   a heating element cooperatively associated with the reservoir for heating water in the reservoir;
   a control valve communicating with the reservoir for controllably dispensing heated water from the reservoir, the controllable valve including at least one temperature sensitive material which is directly contacted by and directly mechanically responsive to the temperature of the water in the reservoir to operate the valve;
   wherein the reservoir heats water by means of the heating element to a temperature which causes the control valve to at least partially open in response to the temperature of the water contacting at least a portion of the control valve and dispense water from the reservoir to the brewing substance holder; and
   in which the heating element includes a circuitous heating path in which water is fed from the reservoir to the heating path and returned to the reservoir to add heat energy in the circuitous path until a water temperature within a predetermined range of temperatures is achieved.

2. The brewer of claim 1, further comprising a first reservoir and a second reservoir, the control valve being positioned between the first and second reservoir with the second reservoir positioned proximate to the brewing substance holder for dispensing heated water from the second reservoir.

3. The brewer of claim 1, in which the control valve is a passive control valve.

4. The brewer of claim 1, in which the control valve includes a bimetallic portion which is directly and mechanically responsive to temperature, the bimetallic portion being in a normally closed position to prevent passage of water from the reservoir and operating to an open position when the temperature of the water in the reservoir is raised with a predetermined temperature range.

5. The brewer of claim 1, in which the control valve includes a magnetic portion which is responsive to temperature, the magnetic portion being in a normally closed position to prevent passage of water from the reservoir and operating to an open position when the water in the reservoir, which directly contacts the temperature sensitive material, is at a temperature within a predetermined temperature range.

6. The brewer of claim 1, in which the control valve is removable and replaceable with a second control valve.

7. The brewer as in claim 6 including a plurality of control valves, each control valve including a temperature sensitive material which is responsive to a different temperature or range of temperatures, wherein the use of a selected valve will allow brewing at a selected predetermined temperature range.

8. A process for producing a beverage using a beverage brewer, the brewer including at least one reservoir, a heating element cooperatively associated with the reservoir for heating water in the reservoir, a brewing substance holder cooperatively associated with the reservoir for receiving water from the reservoir and combining, in the holder, substance in the holder with water dispensed from the reservoir, and a passive temperature sensitive control valve communicating with the reservoir to control the flow of water out from the reservoir, the control valve including at least one temperature sensitive material which is directly contacted by the water in the reservoir to operate the valve an directly mechanically responsive to the temperature of the water contacting it, the method comprising:
   placing water into the reservoir;
   activating the heating element to heat water in the reservoir;

adding heat energy through the heating element to water in the reservoir until a temperature within a predetermined temperature range is achieved;

operating the passive heat sensitive control valve upon achieving a temperature associated with the control valve in response to the temperature of the water directly contacting at least a portion of the temperature sensitive material;

dispensing water from the reservoir for dispensing into the beverage substance holder;

combining the substance retained in the holder with the heated water; and dispensing beverage from the holder into a container; and further including providing a circuitous heating path, the method further comprising: passing water from the reservoir through the circuitous heating path for return to the reservoir during the heating process.

9. The method of claim 8, further including providing two reservoirs, a first reservoir being positioned above a second reservoir with the passive, temperature sensitive control valve being positioned between the first and second reservoirs, the method further comprising: dispensing water from the first reservoir to the second reservoir to prevent continued heating of water after achieving a water temperature within a predetermined range of temperatures, dispensing water from the second reservoir to the brewing substance holder.

10. The method of claim 8, further including providing the passive temperature sensitive control valve in the form of a valve having at least a bimetallic portion, the method further comprising maintaining the control valve in a normally closed position, operating the control valve to an open condition when the temperature of the water in the reservoir is within a predetermined temperature range to open the valve and dispense water from the reservoir.

11. The method of claim 8, further including providing the passive temperature sensitive control valve in the form of a magnetic valve, the method further comprising maintaining the control valve in a normally closed position, operating the control valve upon reaching a water temperature within a predetermined temperature range to open and dispense water from the reservoir.

12. The method of claim 8, further including providing a plurality of control valves, each of the control valves including a temperature sensitive material which is responsive to a different temperature or range of temperatures, wherein the use of a selected valve will allow brewing within a predetermined temperature range, removing a control valve from the reservoir, replacing the control valve with a different control valve, wherein the different control valve has a different temperature range setting to facilitate brewing within a second predetermined temperature range.

* * * * *